United States Patent Office 3,519,611
Patented July 7, 1970

3,519,611
AROMATIC POLYMERS CONTAINING PYRAZOLE UNITS AND PROCESS THEREFOR
Allan S. Hay, Schenectady, N.Y., assignor to General Electric Company, a corporation of New York
No Drawing. Filed Mar. 2, 1967, Ser. No. 619,954
Int. Cl. C08f 9/00
U.S. Cl. 260—94.1          7 Claims

ABSTRACT OF THE DISCLOSURE

N-arylsydnones have been found to react with poly-(diacetylenic) polymers to yield polymers containing N-arylpyrazole units in the backbone of the chain. These polymers are more readily set forth as containing units depicted by the following formula:

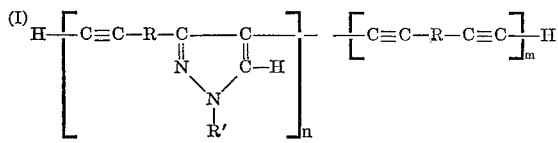

wherein R is a divalent hydrocarbon radical, R' is an aryl group or a substituted aryl group, $n$ is an integer having a value of from 1 to 600 inclusive a whole number having a value of from 0 to 60, inclusive, the sum of $m+n$ has a value of 10 to 600 inclusive and preferably from 100 to 600 inclusive. These pyrazole-containing polymers find utility as insulating films.

---

It has been discovered that the N-arylsydnones can be reacted with the polyacetylene compounds to yield polymers containing pyrazole units in their backbone, said polymers having the general formula indicated above in Formula I.

The novel pyrazole-containing polymers of this invention are produced by the process which comprises forming a mixture of a polyacetylenic compound of the formula (II)

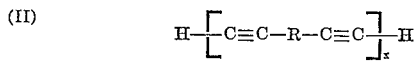

where $x$ is an integer of at least 10 and R is as above defined and an N-arylsydnone of the formula (III)

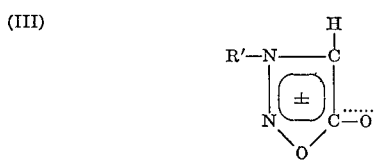

where R' is as above defined and heating the mixture to a temperature whereby the polyacetylenic compound and the N-arylsydnone react to produce the polymer of Formula I and carbon dioxide as a by-product. The reaction can be readily followed by the evolution of the carbon dioxide and noticing when carbon dioxide ceases to be evolved.

Although a solvent is not necessary in conducting the process of this invention, a solvent is desirable for ease of reaction and ease of recovery of the reaction products. Solvents which are useful in the process of this invention are those in which the N-arylsydnone of Formula III and the polyacetylenic polymer of Formula II are at least partially soluble (i.e., soluble to the extent of at least about 10% by weight) and which does not react with either of the reactants, or a solvent in which the reaction product of Formula I is at least partially soluble. It is further preferred to employ solvents which boil above about 125° C. so that the reaction mixture can be heated to such temperature so that carbon dioxide can be evolved and the reaction driven to completion. Such sovlents are, for example, o-dichlorobenzene, xylene, toluene, diphenyl ether, etc. The amount of the solvent empolyed is not narrowly critical and can range from 10 parts solvent to 100 parts reactants to 1000 parts of the solvent per 100 parts of the total reactants.

The temperature at which the process of the instant invention is conducted is critical. The temperature can range generally from 80° C. to 180° C. It is preferred that the temperature be maintained at from 100° C. to 170° C. It has been found that the polyacetylenic starting material decomposes rapidly at temperatures above 180° C., thereby leading to by-products which render isolation of the polymer of the invention more difficult.

The ratio of reactants employed in the process of the instant invention is not narrowly critical and can vary from 1 mole of the N-arylsydnone of Formula III for each 100 mer units in the polyacetylenic compound of Formula II to 10 or more moles of the N-arylsydnone of Formula III to each mole of the mer unit in the compound of Formula II. However, it is preferred to employ 1 mole of the N-arylsydnone of Formula III for each mer unit in the polyacetylenic compound to insure completeness of reaction and ease of recovery of the reaction product. If the amount of the N-arylsydnone is less than 1 mole per mole of the mer unit, it results in a polymer which contains less than 1 pyrazole unit per mer unit in the total polymer.

The divalent hydrocarbon in the groups represented by R are, for example, alkylene groups having the formula —$C_tH_{2t}$— where $t$ is 1 to 12, such as methylene, ethylene, propylene, isopropylidene, hexylene, etc.; arylene groups such as phenylene, tolylene, naphthylene, etc. It is preferred that R represent arylene groups because arylene groups make the polymer oxidatively and thermally more stable. It is to be understood that R need not necessarily mean the same group throughout the polymer molecules. These polymeric acetylenes are more specifically set forth in my Pat. No. 3,300,456, issued Jan 24, 1967 and assigned to the same assignee as the instant invention, which by reference is made part of the instant application.

The aryl groups represented by R' can contain up to 12 carbon atoms and are, for example, the phenyl group and substituted phenyl groups having the formula

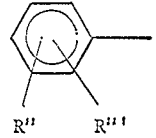

(IV)

wherein R" and R'" are selected from the group consisting of hydrogen, chlorine, bromine and alkyl groups having from 1 to 8 carbon atoms and the aryl groups such as naphthyl, biphenyl, phenoxyphenyl, benzoylphenyl, etc.

Examples of polymers (including copolymers) which are produced in accordance with this invention are those having the formula

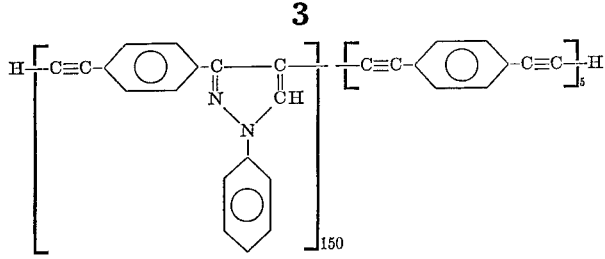

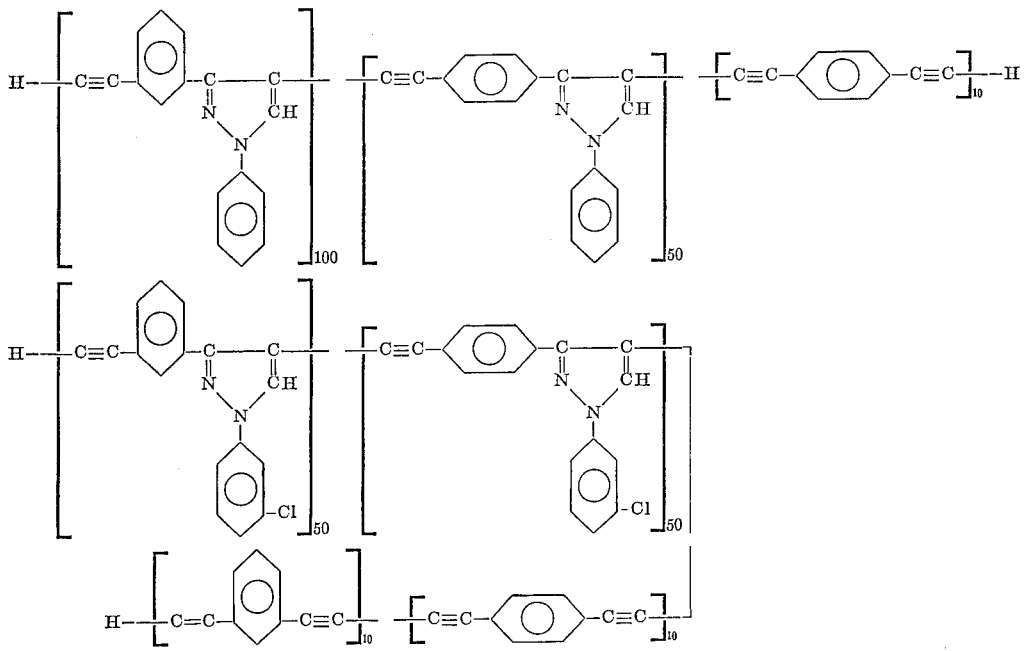

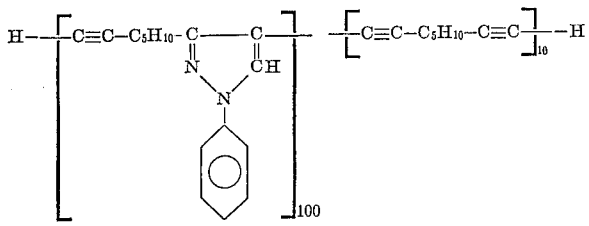

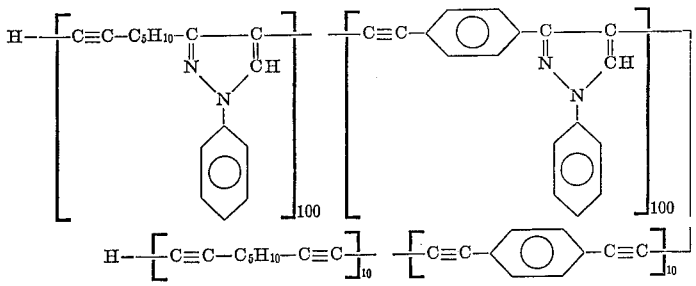

etc. It is, of course, realized by those skilled in the art that the units in the polymers are dispersed throughout the polymer in a random manner.

It has been found that when $(m)$ in Formula 1 is 0, the polymer is very stable thermally and can be molded into shaped articles as are other thermoplastic polymers. It has also been found that if the polymer of Formula I contains some conjugated acetylenic units, in the range of 0.001 to 10 mole percent, the polymer can be crosslinked thermally to yield a thermoset polymer.

The polymeric compositions of the present invention find utility as insulating films for conductors, motor coils, slot liners, as a capacitor film, etc. For example, these polymers can be cast into a film from symmetrical tetrachloroethane and the symmetrical tetrachloroethane evaporated and the film heated to 250° C. to form a crosslinked film which is insoluble in boiling symmetrical tetrachloroethane but is still flexible.

The following examples serve to further illustrate this invention. All parts are by weight unless otherwise set forth.

EXAMPLE 1

A suspension of a polymer obtained by the oxidative coupling of m-diethynylbenzene prepared in accordance with aforementioned U.S. Pat. No. 3,300,465, having the general formula (V)

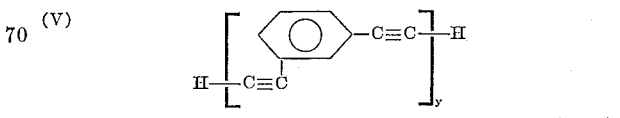

where $y$ is about 150 (5.8 g., 0.047 m.) and N-phenyl-sydnone (15.2 g., 0.094 m.) in o-dichlorobenzene (150 ml.) was prepared and the suspension heated to 125° C. at which point the mixture became homogeneous. The temperature of the reaction mixture was raised to 160° C. at which point carbon dioxide began to evolve. The temperature was maintained at 160° C. for two hours and then raised to 170° C. for 85 minutes and refluxed at 170° C. for an additional two hours. The reaction mixture was then allowed to cool and was added to methanol and the polymer precipitated. The polymer was removed by filtration, dissolved in chloroform, filtered and reprecipitated in methanol and dried in a vacuum at 100° C. to yield 11.5 g. of polymer. This polymer had the following analysis:

Calculated (percent): C, 84.27; H, 4.16; N, 11.56.
Found (percent): C, 84.0; H, 4.3; N, 10.6.

This corresponds to a polymer having the approximate composition,

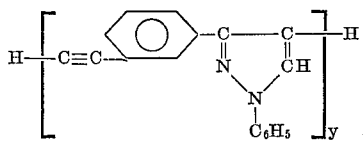

where $y$ is the same as above.

Theromgravimetric analysis of the polymer in air and nitrogen indicates no weight loss up to about 450° C. In nitrogen the polymer had lost 19.4% of its weight at 1000° C.

This polymer was dissolved in sym-tetrachloroethane and cast into a film and the film heated to 250° C. for 1 minute after which the film was flexible but insoluble in boiling symmetrical tetrachloroethane.

It will, of course, be apparent to those skilled in the art that modifications other than those set forth in the above examples can be employed in the process of this invention without departing from the scope thereof.

What I claim as new and desire to secure by Letters Patent of the United States is:

1. A composition of matter comprising a polymer having the average formula,

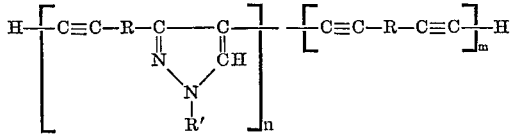

wherein R is selected from $C_tH_{2t}$, where $t$ is 1 to 12, and arylene radicals, and R' is selected from phenyl radicals included by the formula,

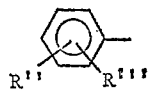

wherein R'' and R''' are selected from the group consisting of hydrogen, chlorine, bromine and alkyl radicals having from 1 to 8 carbon atoms and aryl radicals, $n$ is an integer having a value of from 1 to 600 inclusive and $m$ is a whole number having a value of from 0 to 60 inclusive and the sum of $m$ and $n$ has a value of 10 to 600 inclusive.

2. A process which comprises (1) mixing together an N-arylsydnone of the formula,

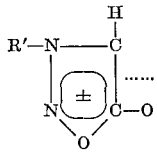

and a polyacetylene compound of the formula,

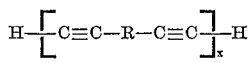

to produce a mixture having from 0.01 to 10 mole of the N-arylsydnone, per mole of the polyacetylene compound, and (2) heating the mixture to (1) to a temperature in the range of from 80° C. to 180° C. to effect reaction between the N-arylsydnone and the polyacetylenic compound, wherein R is selected from alkylene having the formula $C_tH_{2t}$, where $t$ is 1 to 12, and arylene radicals, and R' is selected from phenyl radicals included by the formula,

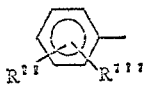

wherein R'' and R''' are selected from the group consisting of hydrogen, chlorine, bromine and alkyl groups having from 1 to 8 carbon atoms and aryl radicals and $x$ is an integer of at least 10.

3. A process as claimed in claim 2 wherein the temperature is from 100° C. to 170° C.

4. A process as claimed in claim 2 wherein R' is a phenyl radical.

5. A composition as claimed in claim 1 wherein R is phenylene and R' is phenyl.

6. A process as claimed in claim 2 wherein the reaction is conducted in the presence of a solvent.

7. A process as claimed in claim 6 wherein the solvent is o-dichlorobenzene.

References Cited

UNITED STATES PATENTS 3,300,456 1/1967 Hay _____ 260—94.1
3,332,916 7/1967 Hay _____ 260—80

HARRY WONG, Jr., Primary Examiner

U.S. Cl. X.R.

260—88.1, 33.6, 33.8, 33.2, 47, 88.3